US008121362B2

(12) United States Patent
Zhan et al.

(10) Patent No.: US 8,121,362 B2
(45) Date of Patent: Feb. 21, 2012

(54) REGISTRATION OF MEDICAL IMAGES USING LEARNED-BASED MATCHING FUNCTIONS

(75) Inventors: Yiqiang Zhan, Phoenixville, PA (US); Xiang Zhou, Exton, PA (US); Arun Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 968 days.

(21) Appl. No.: 12/110,643

(22) Filed: Apr. 28, 2008

(65) Prior Publication Data

US 2008/0267483 A1    Oct. 30, 2008

Related U.S. Application Data

(60) Provisional application No. 60/914,840, filed on Apr. 30, 2007.

(51) Int. Cl.
*G06K 9/00*    (2006.01)
(52) U.S. Cl. ........................................................ 382/128
(58) Field of Classification Search ........................ None
See application file for complete search history.

(56) References Cited

U.S. PATENT DOCUMENTS

2007/0036402 A1* 2/2007 Cahill et al. ................. 382/128

FOREIGN PATENT DOCUMENTS

| WO | 2005/059831 A | 6/2005 |
| WO | 2007/044508 A | 4/2007 |

OTHER PUBLICATIONS

Xu et al., "Two-Dimensional PCA Combined With PCA for Neural Network Based Image Registration", Advances in Natural Computation Lecture Notes in Computer Science, Springer, Berlin, DE, vol. 4222, Jan. 1, 2006, pp. 696-705.
Zhou et al., "BoostMotion: Boosting a Discriminative Similarity Function for Motion Estimation", Computer Vision and Pattern Recognition, 2006 IEEE Computer Society Conference on New York, Jun. 17-22, 2006, IEEE, Piscataway, NJ, vol. 2, Jun. 17, 2006, pp. 1761-1768.
Xue et al., "Simulating deformations of MR brain images for validation of atlas-based segmentation and registration algorithms", Neuroimage, Academic Press, Orlando, FL, vol. 33, No. 3, Nov. 15, 2006, pp. 855-866.
Betke et al., "Landmark detection in the chest and registration of lung surfaces with an application to nodule registration", Medical Image Analysis, vol. 7, No. 3, 2003, pp. 265-281.
Wu et al., "Learning-based deformable registration of MR brain images", IEEE Transactions on Medical Imaging, vol. 25, No. 9, 2006, pp. 1145-1157.
International Search Report including Notification of Transmittal of the International Search Report, International Search Report, and Written Opinion of the International Searching Authority.

* cited by examiner

*Primary Examiner* — Clayton E Laballe
*Assistant Examiner* — Dennis Hancock
(74) *Attorney, Agent, or Firm* — Peter Robert Withstandley

(57) ABSTRACT

A method for registering a medical image includes acquiring a first medical image of a subject. One or more simulated medical images are synthesized based on the acquired first medical image. One or more matching functions are trained using the first medical image and the simulated medical images. A second medical image of the subject is acquired. The first medical image and the second medical image are registered using the one or more trained matching functions.

20 Claims, 4 Drawing Sheets

REGISTRATION OF MEDICAL IMAGES USING LEARNED-BASED MATCHING FUNCTIONS

CROSS-REFERENCE TO RELATED APPLICATION

The present application is based on provisional application Ser. No. 60/914,840, filed Apr. 30, 2007, the entire contents of which are herein incorporated by reference.

BACKGROUND OF THE INVENTION

1. Technical Field

The present disclosure relates to registration of medical images and, more specifically, to registration of medical images using learning-based matching functions.

2. Discussion of Related Art

Medical images are images of a human subject that are analyzed for the purposes of diagnosing and treating disease, injury and birth defects. While medical images may be captured using conventional photography, more commonly, medical images involve modalities that are able to image the internal structure of the subject in a non-invasive manner. Examples of such modalities include computed tomography (CT), magnetic resonance imaging (MRI), positron emission tomography (PET), ultrasound, fluoroscopy, conventional x-rays, and the like. Medical images may be analogue or digital, two-dimensional or three-dimensional; however, three-dimensional modalities are digital.

Traditionally, acquired medical images are meticulously inspected by a trained medical practitioner, for example a radiologist, to detect instances of abnormality that may be indicative of disease. When disease is found, the radiologist may be able to gain additional diagnostic information from the image, such as a characterization of a size and shape of a suspicious lesion. Additionally, the medical images may be used to accurately locate a lesion so that treatments such as chemotherapy and radiotherapy may be precisely delivered and surgery may be effectively planned.

Where the medical images are three-dimensional, the practitioner may step through a sequence of two-dimensional image slices at regular intervals, inspecting each slice. Thus, inspection of medical images may be tedious and prone to error.

Accordingly, methods of computer aided detection (CAD) have been developed for the automatic location, characterization, and segmentation of suspicious lesions within the human subject. For example, CAD may be used to detect regions that may be tumors. CAD may also be used to locate, characterize and segment anatomical structures. For example, a ribcage may be identified within a medical image.

CAD may either be fully automatic or user assisted. In user assisted CAD, a user may identify certain key structures within the medical image or may otherwise modify search parameters until the user is satisfied with the computerized identification. In fully automatic CAD, user assistance is not required.

Image registration is one of the key technologies of various CAD systems. Registration methods aim to find the optimal transformation between a pair of images. Mathematically, it can be formulated as an optimization problem as Eq. (1).

$$\max_{T} S(I_1, T(I_2)) \qquad (1)$$

Here, $I_1$ and $I_2$ denote the image pair understudy. S denotes the matching function. T denotes the transformation, which is the variable to be optimized.

Using image registration methods, medical images of different patients or medial images of the same patient taken at different time points can be brought to a canonical space, where the same coordinate corresponds to the same anatomical structures. Image registration plays a fundamental role in populational and longitudinal studies of anatomy and pathology. For example, by registering two medical images of the same patient taking at two different time points, the changes in size, shape, position and function of various anatomical structures between the two time points are revealed. In this way, the progress of disease and/or effectiveness of treatment may be effectively monitored over time.

The effectiveness of registration methods, however, depends greatly on using the proper matching function/similarity measurement. Accordingly, except where otherwise indicated, as used herein, "matching function" and "similarity measurement" share the same meaning.

In recent decades, researchers have proposed multiple matching functions, including cross-correlation, entropy of the difference image and mutual information, etc. However, according to comparison studies, none of these methods is superior to others across different registration problems. Accordingly, there is presently no universally "good" matching unction for medical image registration, and it is unlikely that such a matching function may ever be developed. For any specific application, matching function must be chose to adapt to the nature of the images. Additionally, it is possible that none of the available matching functions is adequate.

Manual design selection of a matching function may involve extensive human involvement, which increase the development cost for registration methods. The high empirical nature of manually designed/selected matching functions might be far from the optimal matching function. Moreover, the scalability of a registration method with a manual designed/selected matching function will be very limited. In an even worse scenario, if the optimal matching function is spatially adaptive, it is very difficult, if not impossible, to manually design/select a set of matching functions.

SUMMARY

A method for registering a medical image includes acquiring a first medical image of a subject. One or more simulated medical images are synthesized based on the acquired first medical image. One or more matching functions are trained using the first medical image and the simulated medical images. A second medical image of the subject is acquired. The first medical image and the second medical image are registered using the one or more trained matching functions.

The first medical image may be a CT, MRI, or PET image. Synthesizing the one or more simulated medical images based on the acquired first medical image may include applying one or both of spatial transformations and intensity transformations to the first medical image to generate one or more of the one or more simulated medical images.

A transformation function may be used to transform the first medical image and the transformation function includes a randomly generated value to randomize each of the resulting simulated medical images. The first medical image may be transformed with a non-rigid deformation.

The quantity, diversity and complexity of the simulated medical images may be user selectable. The synthesis of the one or more simulated medical images may be performed offline. Synthesizing the one or more simulated medical images based on the acquired first medical image may include varying the intensity of the first medical image to generate one or more simulated medical images.

The one or more matching functions may be trained using positive and negative training data. The positive training data may include a portion of the first medical image and a matching portion of one of the simulated medical images and the negative training data may include a portion of the first medical image and a non-matching portion of one of the simulated medical images.

The method may additionally include, prior to training the one or more matching functions, locating one or more anchor points within the acquired first medical image and locating corresponding anchor points within each of the simulated medical images.

The anchor points may be automatically detected within the first medical image using learning-based landmark detection. Each of the one or more matching functions may correspond to a particular anchor point. The one or more trained matching functions may be applied hierarchically in registering the first medical image and the second medical image.

Registering the first medical image and the second medical image may include matching a first subset of points with a high matching confidence to find corresponding portions of the first and second medical images and later, to the extent necessary, matching a second subset of points with a lower matching confidence to find corresponding portions of the first and second medical images, wherein a relationship between corresponding portions of the first and second medical images found using the first subset of the points are used to facilitate the use of the second subset of the points to find corresponding portions of the first and second medical images.

A method for registering a medical image includes acquiring a medical image of a first subject. One or more simulated medical images are synthesized based on the acquired medical image of the first subject. One or more anchor points are located within the acquired medical image of the first subject. Corresponding anchor points are located within each of the simulated medical images. One or more matching functions are trained, each corresponding to one of the anchor points, using the medical image of the first subject and the simulated medical images. A medical image of a second subject is acquired. The medical image of the first subject and the medical image of the second subject are registered using the trained matching functions. Correspondences of points that are not anchor points are determined by interpolating a general relationship between the medical images of the first and second subjects based on the trained matching functions for the anchor points.

Synthesizing the one or more simulated medical images based on the acquired medical image of the first subject may include transforming the medical image of the first subject to generate one or more of the one or more simulated medical images.

A transformation unction may be used to transform the medical image of the first subject and the deformation function may include a randomly generated value to randomize each of the resulting simulated medical images. The one or more trained matching functions may be applied hierarchically in registering the medical image of the first subject and the medical image of the second subject.

A computer system includes a processor and a program storage device readable by the computer system, embodying a program of instructions executable by the processor to perform method steps for registering a medical image. The method includes acquiring a first medical image of a subject. One or both of a spatial transformation and an intensity transformation are applied to the acquired first medical image to generate one or more simulated medical images. One or more matching functions are trained using the first medical image and the simulated medical images. A second medical image of the subject is acquired. The first medical image and the second medical image are registered using the one or more trained matching functions. The quantity, diversity and complexity of the simulated medical images may be user selectable.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
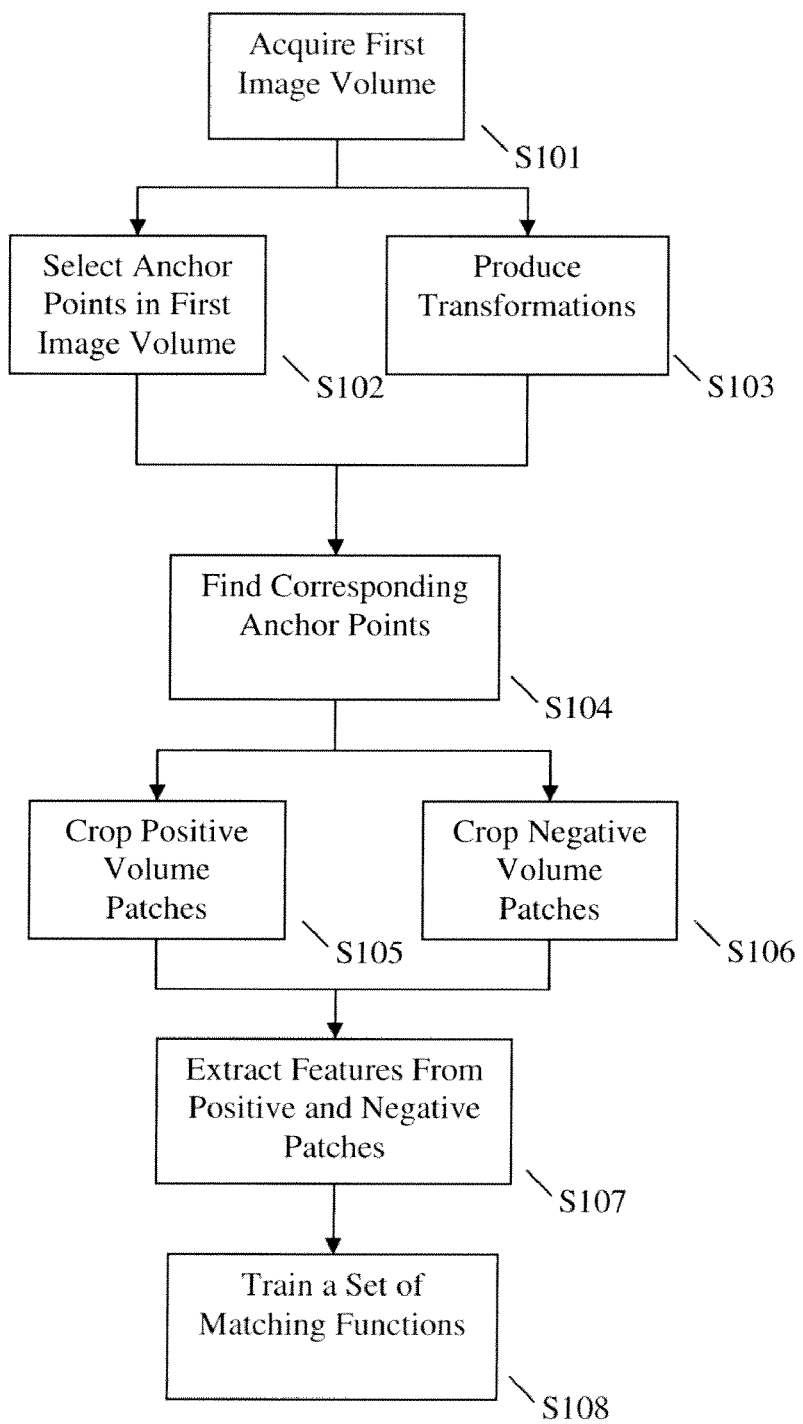
FIG. 1 is a flow chart illustrating a method for generating training data according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to perform automatic generation of matching functions that are patient and or image specific so that effective image matching may be performed. Automatic generation of matching functions may utilize a learning-based method. The learning-based method automatically generates a matching function based on sets of training data including a real medical image and a set of simulated images that are generated from the real medical image. The simulated images may be generated by applying spatial/intensity transformation to the real medical image. The spatial transformation may include but not limit to rigid transformation, similarity transformation, affine transformation, spline transformation and free form deformation, etc. The intensity transformation may include but is not limited to linear transformation, polynomial transformation and kernel-based transformation, etc. Various transformation parameters may be randomly generated such that multiple diverse sets of training data may be produced.

This approach is substantially different from conventional learning methods. In conventional learning methods, training data usually includes an actual set of medical images with given annotations.

In exemplary embodiments of the present invention, the simulated training samples are automatically generated and thus no manual process is required during the learning process. Moreover, because automatic spatial transformation is performed, an exact correspondence map between each pixel of the original image and each pixel of the transformed image may be known. This level of relation may be more exact than manually annotated image data because in manually annotated image data, the correspondences between two images are only known at a few key locations.

In conventional learning approaches, training data may include medical images of multiple subjects and thus the results of the learning process are weakened by the variation in structure between different subjects. Meanwhile, in exemplary embodiments of the present invention, the training samples are generated with the restriction of domain knowledge for specific registration problems. For example, to deal with an intra-patient bone registration problem, the spatial transformation might be restricted to rigid transformation. Additionally, exemplary embodiments of the present invention may provide for the automatic generation of as many sets of training data as needed to produce an effective matching function, without the need for acquiring additional medical images or manual annotations.

Exemplary embodiments of the present invention therefore relate to a method for automatically generating a matching function based on as few as one medical image by transforming the medical image in a plurality of ways. Additionally, exemplary embodiments of the present invention relate to a method for registering two medical images using a matching function that has been automatically generated according to the above-described approach.

Before the matching function may be automatically generated, training data must be created. As discussed above, in conventional computer learning approaches, training data is imported. Exemplary embodiments of the present invention generate training data.

Training data may be generated from as little as a single medical image, although additional medical images may be used. When exemplary embodiments of the present invention are used to register an earlier medical image with a latter medical image of the same patient, the earlier medical image may be used to generate the training data. However, exemplary embodiments of the present invention may additionally or alternatively use other medical images to generate the training data. Therefore, exemplary embodiments of the present invention may address inter-patient image registration problems as well.

The medical image may then be spatially transformed. Transformation of the medical image may be accomplished by processing the medical image using a transformation function. The transformation function may be linear or higher-order. Accordingly, the resulting transformations may be both rigid and non-rigid. The transformation function may include constants and variables. The variables may be populated using a random number generator so that the transformation may include an element of randomness so that multiple transformations performed by the same transformation function may produce different deformations.

The medical image may be repeatedly transformed using a single transformation function with different randomly populated variables or multiple transformation functions may be used. For each transformation, multiple sets of training data are created. Each set of training data may include the original medical image, the transformed medical image, and a correspondence map that relates the pixels of the original medical image to the pixels in the transformed medical image.

Greater diversity and complexity of training data and increased total number of data sets may result in a more effective matching function. However, increasing the total number of transformation, the diversity of transformations and the complexity of transformations may all add to the computational expense and time needed to generate the full collection of training data sets. Accordingly, a user may select the desired level of diversity, complexity and total number of sets as needed and as time permits. The user may make this determination based on the expected degree of spatial/intensity transformation between the initial medical image and the subsequent medical image. If it is expected that the two medical images will be substantially similar, the user may select low levels of diversity, complexity and total number of sets. If it is expected that the two medical images will be substantially dissimilar, then the user may select high levels of diversity, complexity and total number of sets. The user may manually select each setting or may choose from a selection of predetermined settings. Alternatively, the user may control an on-screen slider bar that automatically adjusts each setting based on the location of the slider from "fastest" to "most effective."

Because generation of training data and subsequent processing steps may be computationally expensive and time consuming, calculations may be performed off-line. For example, calculations need not be performed in real-time, but rather the calculations may be performed at a time when the necessary computing resources and time is available. For example, data processing may be performed by a set of one or more servers that may be located remotely with respect to the medical image scanning equipment. For example, calculations may be performed by a mainframe computer located off-site. According to another example, the hospital or medical facility that houses the medical image scanning equipment may utilize a great number of networked personal computers, the processing power of which remain largely unutilized. When idle, these computers may be used to perform the calculations in accordance with a distributed computing approach.

However the calculations are performed, the ultimate result may be a plurality of sets of training data generated from as few as one original medical image. The concept behind the generation of training data by deforming the original medical image is to simulate the changes that might be observed when the subsequent medical image is acquired at a later point in time. These changes may include changes in size and shape of various anatomical structures due to such factors as the framing of the medical scan, the pose of the subject being scanned, and the advancement or remission of disease. However, changes may also include variations in image intensity. Therefore, transformation functions may include intensity variation characteristics. Thus, rather than training the matching function with actual sets of "former" and "subsequent" medical images, the matching function may be trained with sets of the actual medical image and examples of what the subsequent medical image might look like. Accordingly, the deformed medical images may be conceptualized as simulated "subsequent" medical images.

Both simulated spatial transformations and intensity variations may be restricted in range. This restriction may reflect realistic transformations and intensity variations between intra-patient volumes.

One or more anchor points may be placed within the medical image prior to transformation. Anchor points are locations that are not transformed but rather, transformation may be performed about these points. The use of anchor points may create a more realistic and useful deformation. Anchor points may be placed within structures that are unlikely to have changed between the former and subsequent medical images. For example, anchor points may be located within certain skeletal features. Anchor points may be manually selected from the original medical image or anchor points may be automatically detected.

Anchor points may also be placed at key locations within particular anatomical parts to define a region representing a particular anatomical part. Anchor points maybe categorized into two classes. The first class may be anatomically meaningful, for example, the carina of trachea, femoral head and coccyx may each be used as an anchor point with anatomical significance. These anchor points may be defined manually and may be automatically detected from the medical image volume using learning-based landmark detection methods known in the art.

The second class of anchor points may be detected according to their local appearance characteristics. In general, these anchor points may tend to have salient image features, for example, strong edges, strong corners, and/or a highly textured context.

As discussed above, each data set may include the original medical image, a set of transformed medical image with correspondence maps that relate the original medical image to the deformed medical image. This correspondence may include a correspondence between anchor points of the original and deformed images as well as the points surrounding each anchor point.

The correspondence map may provide the ground truth of the spatial transformations between two medical images. Thus the correspondence map may provide evidence of positive (correctly matched patches) and negative training data (mismatched patches), which may be used to learn the matching functions.

Each patch to be used as positive training data may be cropped such that the location of the anchor point is consistent from patch to patch. For example, the anchor point may be located at the center of each patch. Features extracted from these image patches may be used as positive training samples to train the matching functions for the respective anchor point.

Negative training samples may be extracted as well. For each anchor point, randomly cropped image patches with centers not including the corresponding anchor point may be used. More generally, negative patches may be cropped differently than the positive training patches. Negative patches may be extracted for each anchor point, and thus, for each anchor point, there may be both negative and positive training data.

After the sets of training data have been generated, a learning-based method may be used to create one or more matching functions for performing medical image registration between the former medical image and the subsequent medical image. For example, a set of spatially adaptive matching functions may be created from the training data.

Each of the matching functions may be used to evaluate the similarity of a particular portion of the medical images. For example, each learned matching function may indicate a similarity metric of a specific anchor point and may thus be used to compare the region around a particular anchor point. Thus, where anchor points are indicative of particular anatomical parts, multiple matching functions provide spatially adaptive similarity metric for registration.

Around each anchor point, a matching function may be learned based on the set of training data, for example, using one or more machine learning methods known in the art.

From the set of both positive and negative training data, a discriminative matching function may be learned for each anchor point. A cascade learning algorithm may be used to produce the discriminative matching functions. In each cascade, the best primitive features may be selected for differentiating positive samples from negative samples. The concatenation of the discriminating classifiers may form the matching function for a specific anchor point. The output of these matching functions may indicate the self-matching similarity to the anchor point.

After the matching functions have been developed based on the generated training data, the subsequent medical image may be acquired and the original and subsequent medical images may be registered using the matching functions. Accordingly, the matching functions may be used to generate a matching confidence and spatial distribution for various anchor points. A hierarchical matching strategy may be used to find corresponding anchor points in the subsequent volume of the subject. Hierarchical matching functions may provide robust performance and may be performed relatively quickly.

In hierarchical registration framework, the matching of anchor points with higher matching confidence may be performed first. Since these points have more distinctive anatomical characteristics, it may then be easy and less ambiguous to find their corresponding parts in the new image. Matching of other anchor points may then be assisted by including prior knowledge of their relative positions to the anchor points with the higher matching confidence.

Accordingly, anchor points may be located within the subsequent medical image. A correspondence between the anchor points of the original medical image and the anchor points of the subsequent medical image may be identified. An interpolation model, for example, a thin plate plane, may then be used to interpolate correspondences to the whole image volume for obtaining sense deformation fields to provide a highly-detailed correspondence between the original medical image and the subsequent medical image.

To find the corresponding point of a specific anchor point of the original medical image and the subsequent medical image, the learned matching function of the particular anchor point may be applied to all voxels in the volume of the subsequent medical image. The voxel which is found to have the highest matching degree may be considered the corresponding anchor point in the subsequent image volume.

With the progress of the hierarchical registration procedure, anchor points with lower matching confidence are matched after anchor points with higher matching confidence are matched. Since at this stage, the anchor points with higher matching confidence have found their corresponding parts, the spatial relations of anchor points can be used to guide and restrict the matching of anchor points with lower matching confidence. In this way, the matching ambiguity and the computational cost may be decreased.

After the correspondences between anchor points of the original and subsequent images have been identified, the correspondences may be interpolated to the entire image space using an interpolation model, for example thin plate spline. In this way, the dense deformation fields between intra-patient volumes may be obtained and complete registration may be accomplished.

The learning-based registration framework can be extended to inter-patient registration. The spatial intensity transformations used to generate training samples may be increased to cope with potentially larger variability of structural features between different patients. The need for anatomical landmark detection may be stronger as well. With these minor modifications, the registration stage can take a volume from a different patient instead of the same patient to achieve inter-patient registration.

FIG. 1 is a flow chart illustrating a method for generating training data according to an exemplary embodiment of the present invention. A first image volume may be acquired (Step S101). The first image volume may be a medical image, for example, a CT image, an MRI, a PET image, etc. After the first medical image has been acquired, one or more anchor points may be found within the first medical image (Step S102). The anchor points may be automatically selected or manually selected by a user. The anchor points may represent particular recognizable structural elements.

One or more spatial/intensity transformations may be produced based on the first image volume (Step S103). The transformation may be produced by applying one or more transformation functions to the first image volume. The transformation functions may utilize one or more randomly generated values to produce multiple transformed images from a single transformation function. The transformation functions may be constrained to produce more natural transformations. The transformations may simulate volume transformations, for example, non-rigid deformations and or intensity variations.

The production of the deformations may occur off-line. The number, diversity and complexity of the deformations produced may be dependent upon the ultimate requirements of image registration.

Anchor points corresponding to the anchor points found within the first image volume may then be found within the transformed image volumes (Step S104). For each anchor point, a volume patch centered at an anchor point may be cropped from the first and deformed image volumes (Step S105). As there will be a corresponding volume patch for each anchor point in each image, the pairs of corresponding volume patches may be used as positive training data.

Similarly, for each anchor point, a volume patch with a center away from the anchor point may be cropped from the first and deformed image volumes (Step S106). This patch may be regarded as a non-matching patch. The pairs of mismatched volume patches may be used as negative training data.

Features may then be extracted from both the positive and negative volume patches as training data (Step S107). A set of matching functions may then be trained using machine learning methods (Step S108). These matching functions may be used to compare features of the first medical image with corresponding features of a second medical image taken at a time after the acquisition of the first medical image.

Figure 2:
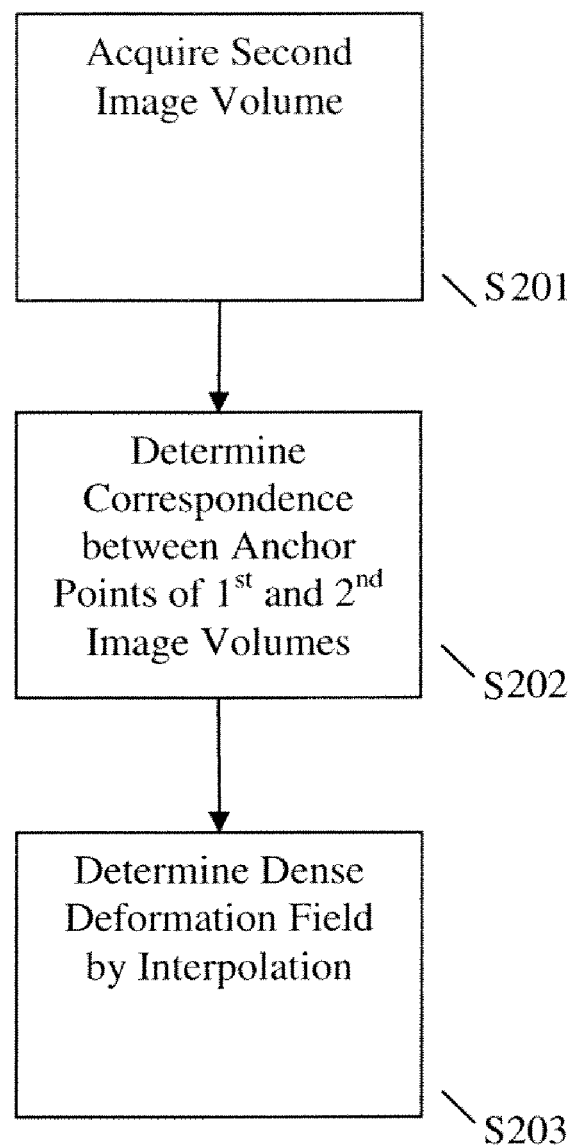
FIG. 2 is a flow chart illustrating a method for registering first and second medical images according to an exemplary embodiment of the present invention.

FIG. 2 is a flow chart illustrating a method for registering first and second medical images according to an exemplary embodiment of the present invention. A second image volume may be acquired (Step S201). The second image volume may be of the same subject of the first image volume but may be acquired at a later point in time, for example, as discussed above. As this procedure may be performed after the procedure discussed above with respect to FIG. 1, the set of matching functions may already be trained. Next, a correspondence between the anchor points of the first and second image volumes may be determined using the trained matching functions (Step S202). A dense deformation field may then be determined by interpolating the correspondence of the non-anchor voxels based on the correspondence of the anchors between the first and second image volumes (Step S203).

Figure 3:
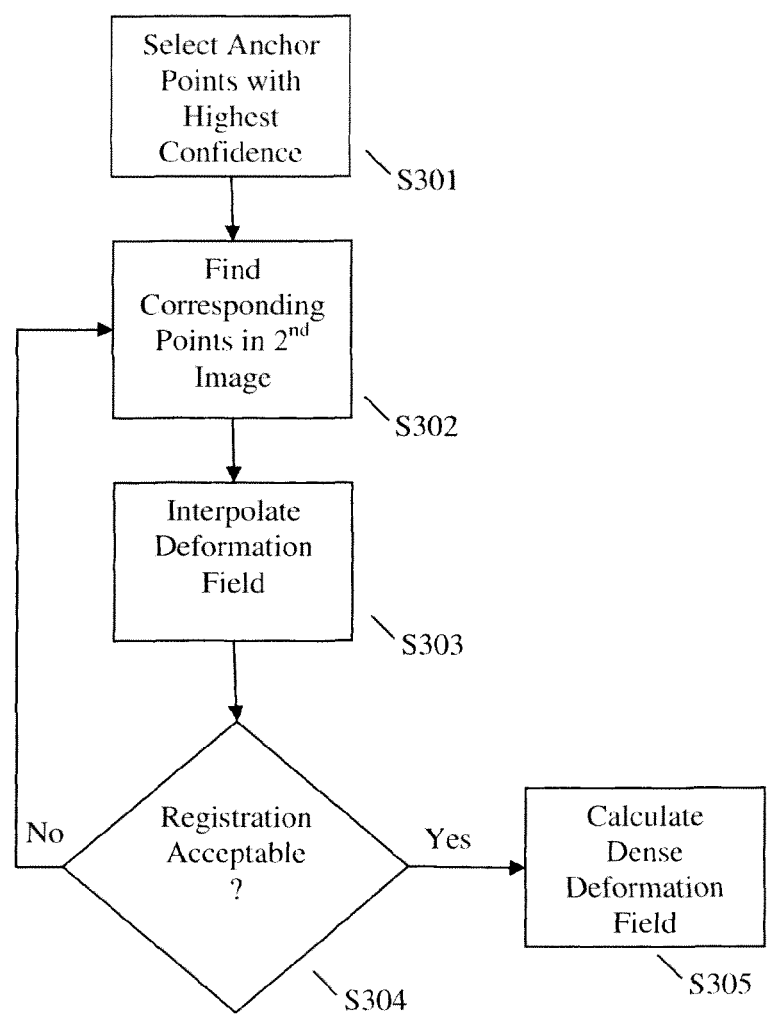
FIG. 3 is a flow chart illustrating a method for performing hierarchical registration to determine correspondences between the first and second image volumes according to an exemplary embodiment of the present invention.

FIG. 3 is a flow chart illustrating a method for performing hierarchical registration to determine correspondences between the first and second image volumes according to an exemplary embodiment of the present invention. This method may be performed as step S202 of FIG. 2. First, a subset of anchor points may be selected (Step S301). The subset of anchor points may be selected as those anchor points with the highest self-matching confidence. The selected anchor points may be distributed substantially evenly throughout the first image volume. Points corresponding to the subset of anchor points of the first image volume may be found within the second image volume (Step S302). The deformation field that is required to transform the first image volume into the second image volume may be calculated by interpolating the relationship between the subset of anchor points within the first and second image volumes (Step S303). Then, it may be determined whether the registration is acceptable (Step S304). If the registration is not acceptable (No, Step S304) then a new subset of anchor points may be selected from among the remaining points and the corresponding set of points may be found in the second image (Step S302). Because an initial deformation field has been calculated, finding corresponding points for the new subset may be performed more easily.

The process of finding new subsets of anchor points and interpolating the deformation field may be repeated until the registration is acceptable (Yes, Step S304). Then, the dense deformation field may be calculated between the two image volumes based on the acceptable registration (Step S305).

Figure 4:
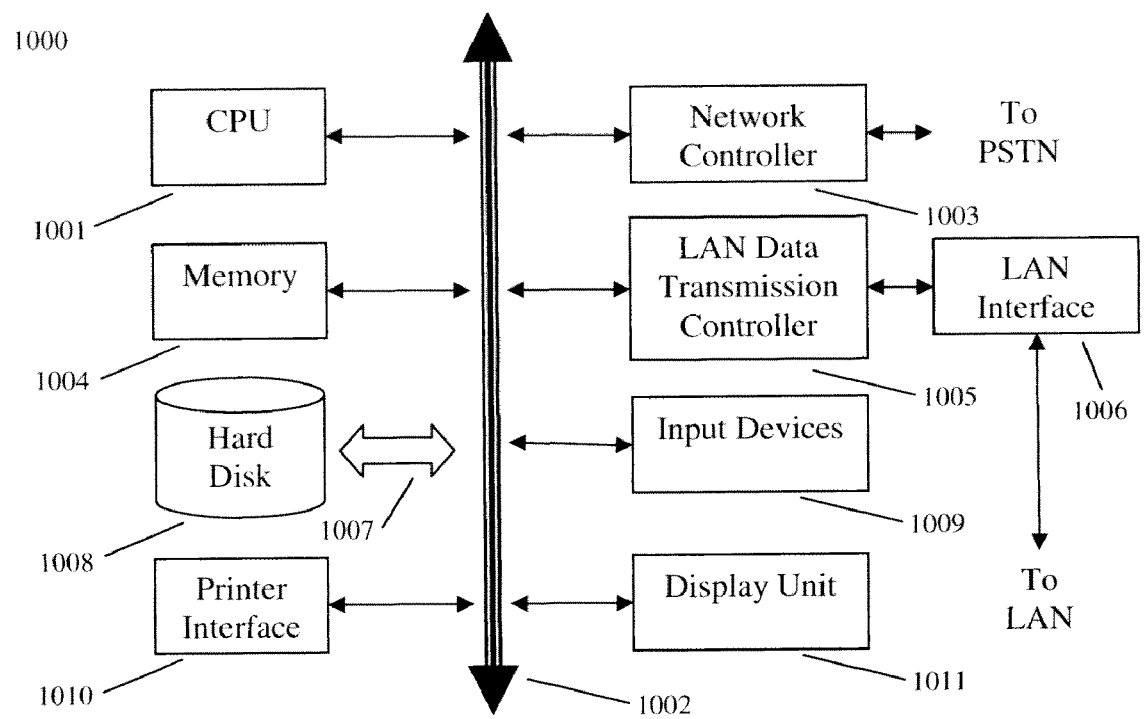
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and or features of different exemplary embodiments may be combined with each other and/or substituted for each other within the scope of this disclosure and appended claims.

What is claimed is:
1. A method for registering a medical image, comprising:
acquiring a first medical image of a subject;
placing one or more anchor points in the first medical image;
synthesizing one or more simulated medical images by transforming the acquired first medical image about the anchor points;
training one or more matching functions using the first medical image and the simulated medical images;
acquiring a second medical image of the subject; and
registering the first medical image and the second medical image using the one or more trained matching functions.
2. The method of claim 1, wherein the first medical image is a CT, MRI, or PET image.

3. The method of claim 1, wherein transforming the acquired first medical image includes applying one or more spatial transformations to the first medical image to generate one or more of the one or more simulated medical images, wherein the one or more spatial transformations comprise a rigid transformation, a similarity transformation, a spline transformation or a free form deformation.

4. The method of claim 3, wherein a transformation function is used to transform the first medical image and the transformation function includes a randomly generated value to randomize each of the resulting simulated medical images.

5. The method of claim 3, wherein the first medical image is transformed with a non-rigid deformation to synthesize the one or more simulated medical images.

6. The method of claim 1, wherein the quantity, diversity and complexity of the simulated medical images are user selectable.

7. The method of claim 1, wherein the synthesis of the one or more simulated medical images is performed offline.

8. The method of claim 1, wherein transforming the acquired first medical image includes applying an intensity transformation to the first medical image to generate one or more simulated medical images, wherein the intensity transformation comprises a linear transformation, a polynomial transformation or a kernel-based transformation.

9. The method of claim 1, wherein the one or more matching functions are trained using positive and negative training data, wherein positive training data includes a portion of the first medical image and a matching portion of one of the simulated medical images and negative training data includes a portion of the first medical image and a non-matching portion of one of the simulated medical images, wherein the positive training data is cropped such that a location of at least one of the one or more anchor points is consistent in the portions.

10. The method of claim 1, additionally comprising performing the following steps prior to training the one or more matching functions:
locating the one or more anchor points within the acquired first medical image; and
locating corresponding anchor points within each of the simulated medical images.

11. The method of claim 10, wherein the anchor points are automatically detected within the first medical image using learning-based landmark detection.

12. The method of claim 10, wherein each of the one or more matching functions corresponds to a particular anchor point.

13. The method of claim 1, wherein the one or more trained matching functions are applied hierarchically in registering the first medical image and the second medical image.

14. The method of claim 13, wherein registering the first medical image and the second medical image includes matching a first subset of points with a high matching confidence to find corresponding portions of the first and second medical images and later, to the extent necessary, matching a second subset of points with a lower matching confidence to find corresponding portions of the first and second medical images, wherein a relationship between corresponding portions of the first and second medical images found using the first subset of the points are used to facilitate the use of the second subset of the points to find corresponding portions of the first and second medical images.

15. A method for registering a medical image, comprising:
acquiring a medical image of a first subject;
placing one or more anchor points within the acquired medical image of the first subject;
synthesizing one or more simulated medical images by transforming the acquired medical image of the first subject about the anchor points;
locating corresponding anchor points within each of the simulated medical images;
training one or more matching functions, each corresponding to one of the anchor points, using the medical image of the first subject and the simulated medical images;
acquiring a medical image of a second subject;
registering the medical image of the first subject and the medical image of the second subject using the trained matching functions; and
determining correspondences of points that are not anchor points by interpolating a general relationship between the medical images of the first and second subjects based on the trained matching functions for the anchor points.

16. The method of claim 15, wherein synthesizing the one or more simulated medical images based on the acquired medical image of the first subject includes transforming the medical image of the first subject to generate one or more of the one or more simulated medical images.

17. The method of claim 16, wherein a transformation function is used to transform the medical image of the first subject and the deformation function includes a randomly generated value to randomize each of the resulting simulated medical images.

18. The method of claim 15, wherein the one or more trained matching functions are applied hierarchically in registering the medical image of the first subject and the medical image of the second subject.

19. A computer system comprising:
a processor; and
a non-transitory program storage device readable by the computer system, embodying a program of instructions executable by the processor to perform method steps for registering a medical image, the method comprising:
acquiring a first medical image of a subject;
placing one or more anchor points within the acquired medical image of the first subject;
applying one or both of a spatial transformation and an intensity transformation about the anchor points in the acquired first medical image to generate one or more simulated medical images;
training one or more matching functions using the first medical image and the simulated medical images;
acquiring a second medical image of the subject; and
registering the first medical image and the second medical image using the one or more trained matching functions.

20. The computer system of claim 19, wherein the quantity, diversity and complexity of the simulated medical images are user selectable.

* * * * *